(12) United States Patent
Wang et al.

(10) Patent No.: US 11,474,011 B2
(45) Date of Patent: Oct. 18, 2022

(54) BENDING TEST APPARATUS AND METHOD FOR FLEXIBLE SHEET MATERIAL

(71) Applicant: SOOCHOW UNIVERSITY, Suzhou (CN)

(72) Inventors: Mingxiang Wang, Suzhou (CN); Wei Jiang, Suzhou (CN); Dongli Zhang, Suzhou (CN); Huaisheng Wang, Suzhou (CN); Ming Wu, Suzhou (CN); Nannan Lv, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 188 days.

(21) Appl. No.: 16/960,586

(22) PCT Filed: Jan. 17, 2018

(86) PCT No.: PCT/CN2018/072933
§ 371 (c)(1),
(2) Date: Jul. 8, 2020

(87) PCT Pub. No.: WO2019/136767
PCT Pub. Date: Jul. 18, 2019

(65) Prior Publication Data
US 2020/0393349 A1 Dec. 17, 2020

(30) Foreign Application Priority Data
Jan. 11, 2018 (CN) .......................... 201810025979.6

(51) Int. Cl.
*G01N 3/20* (2006.01)
*G01N 3/04* (2006.01)
*G01M 5/00* (2006.01)

(52) U.S. Cl.
CPC .............. *G01N 3/20* (2013.01); *G01M 5/005* (2013.01); *G01N 3/04* (2013.01); *G01N 2203/0023* (2013.01)

(58) Field of Classification Search
CPC . G01M 5/005; G01N 3/04; G01N 2203/0023; G01N 3/20
See application file for complete search history.

(56) References Cited

U.S. PATENT DOCUMENTS

2013/0247680 A1* 9/2013 Ota .......................... G01N 3/04
73/788
2017/0191916 A1* 7/2017 Aegerter .................. G01N 3/08

FOREIGN PATENT DOCUMENTS

CN  104101544 A  10/2014
CN  104406520 A  3/2015
(Continued)

*Primary Examiner* — Brandi N Hopkins
(74) *Attorney, Agent, or Firm* — SZDC Law P.C.

(57) ABSTRACT

The present invention discloses a bending test apparatus and method for a flexible sheet material. The apparatus comprises a mounting table and further comprises a clamping unit and a bending shaft unit. The clamping unit comprises a clamping part. The bending shaft unit comprises a bending shaft extending in a Z-axis direction. The bending shaft has an arc-shaped sidewall for abutting against a flexible sheet material at an end thereof away from the clamping part. The clamping part moves relative to the bending shaft in a Y-axis direction. The present invention has the following advantage: During a test, a flexible sheet material is bent with a lower external strain, has a wide adjustment curvature range, and the structure is optimized.

8 Claims, 2 Drawing Sheets

(56) References Cited

FOREIGN PATENT DOCUMENTS

| | | |
|---|---|---|
| CN | 105115830 A | 12/2015 |
| CN | 206311435 U | 7/2017 |
| CN | 206339453 U | 7/2017 |
| CN | 107219118 A | 9/2017 |
| CN | 206601304 U | 10/2017 |
| KR | 20160024289 A | 3/2016 |

\* cited by examiner

BENDING TEST APPARATUS AND METHOD FOR FLEXIBLE SHEET MATERIAL

This application is the National Stage Application of PCT/CN2018/072933, filed on Jan. 17, 2018, which claims priority to Chinese Patent Application No.: 201810025979.6, filed on Jan. 11, 2018, which is incorporated by reference for all purposes as if fully set forth herein.

FIELD OF THE INVENTION

The present invention relates to the technical field of testing device, and in particular, to a bending test apparatus and method for a flexible sheet material.

DESCRIPTION OF THE RELATED ART

With the development of information technology and material science, portable electronic devices such as bendable smartphones and wearable electronic products become increasingly popular. Flexible electronic devices have attracted many customers' interests for their exceptional user experience and wider use ranges.

For example, flexible sensors are highly flexible and ductile, which can be arranged according to requirements of measurement conditions and conveniently fit on objects with complex shapes, and therefore, they are widely applied to the fields such as electronic skin, medical care, and aeronautics and astronautics. For another example, flexible display screens used as human-machine interfaces can provide a better visual effect, and satisfy screen requirements of wearable devices. Moreover, the use range of flexible display screens can be expanded to modern buildings, smart homes, and automotive electronics and so on.

Although flexible electronic devices are gradually entering people's daily life, the actual popularization is more a prospect than a reality. In use process, especially under long-term mechanical stresses such as axial tension, torsion and inward/outward bending, the performance of flexible material may change dramatically. A multi-layer flexible material may delaminate and fracture. Electronic devices arranged on the flexible material may be damaged, leading to the performance degradation of the electronic devices. Therefore, a specialized apparatus is needed to simulate a process of applying a bending stress during actual use of flexible sheet material.

SUMMARY OF THE INVENTION

A technical problem to be solved by the present invention is to provide a bending test apparatus and method for a flexible sheet material. During a test with the apparatus and method, a flexible sheet material is bent with a lower external strain and a wide adjustment curvature range.

For the above purpose, the invention provides the following technical solutions:

In one aspect, the present invention provides a bending test apparatus for a flexible sheet material, which comprises a mounting table, and further comprises a clamping unit and a bending shaft unit. The clamping unit comprises clamping plates, and the bending shaft unit comprises a bending shaft extending in the Z-axis direction. The bending shaft has an arc-shaped sidewall used to abut against a flexible sheet material at an end thereof away from the clamping plates, and the clamping plates move relative to the bending shaft in a Y-axis direction.

Preferably, the clamping plates clamp two ends of the flexible sheet material in the Z-axis direction and enables the flexible sheet material to bend to enclose a barrel-like space, in which the bending shaft is positioned.

Preferably, a chord length corresponding to the arc-shaped sidewall of the bending shaft is greater than or equal to a vertical distance between the clamped two ends of the flexible sheet material in an X-axis direction.

Preferably, the clamping unit further comprises a first sliding plate for mounting the clamping plates, and the clamping plates comprises comprise a clamp plate pad disposed on the first sliding plate, clamping plates symmetrically disposed on two sides of the clamp plate pad along a Y axis, and clamp plate wrenches disposed on the clamping plates for pushing the clamping plates in the X-axis direction to respectively enable two opposite ends of the flexible sheet material to abut against the clamp plate pad.

Preferably, the bending shaft unit further comprises a second sliding plate fixedly connected with the bending shaft, and the first sliding plate is slidable in the Y-axis direction and can abut against the second sliding plate.

Preferably, a first elastic unit is disposed on the first sliding plate for abutting against and driving the second sliding plate in the Y-axis direction, and a second elastic unit is disposed on the mounting table for limiting the second sliding plate in the Y-axis direction.

Preferably, a stop plate unit extending in the Z-axis direction is disposed on the mounting table, and the stop plate unit comprises a limiting stop plate and a protection plate disposed on a side of the limiting stop plate near the flexible sheet material, and the flexible sheet material is movable in the Y-axis direction and abuts against the protection plate.

Preferably, a guide unit is disposed on the mounting table, and the guide unit comprises a guide rail extending in the Y-axis direction and a plurality of sliding blocks slidably connected to the guide rail, and the first sliding plate and the second sliding plate are fixedly connected to the sliding blocks, respectively.

Preferably, the bending test apparatus comprises a measurement unit, wherein the measurement unit comprises a vernier caliper, a main scale of the vernier caliper is disposed on a sidewall of the guide rail, and a vernier scale is disposed on the first sliding plate and the second sliding plate.

In another aspect, the present invention further provides a bending test method for a flexible sheet material, comprising the steps of:

a: in an initial state, two opposite ends of a flexible sheet material are clamped by a clamping unit so that the flexible sheet material has a hollow barrel-like shape, a first sliding plate moves in a negative direction of a Y axis until a second sliding plate is pushed to abut against a second elastic unit where a first side of a sidewall of the hollow barrel-like flexible sheet material abuts against a protection plate so that the sidewall of the flexible sheet material is flattened;

b: the first sliding plate moves in a positive direction of the Y axis until an opposite second side of the sidewall of the flexible sheet material is touched a bending shaft and then the flexible sheet material begins to bend as the first sliding plate continues to move, until the flexible sheet material is fitted onto the bending shaft in bending shape fully, and the first sliding plate reciprocates; and c: zero point resetting: after the first sliding plate reciprocates N times, the first sliding plate moves in the positive direction of the Y axis where the bending shaft is pulled by the flexible sheet material to move in the positive direction of the Y axis, until the first sliding plate moves to a preset zero point, wherein during the reciprocating of the first sliding plate, under a friction force generated between the second sliding plate and a guide rail, the bending shaft does not displace relative to a mounting table.

By means of the foregoing technical solutions, the present invention has the following advantages:

1. A clamping unit comprising clamping plates is disposed, so that a flexible sheet material can be desirably fixed and driven to move in a Y-axis direction. Furthermore, the structure is optimized and clamping is convenient.

2. A bending shaft unit comprising a bending shaft is disposed, and the bending shaft has an arc-shaped sidewall for abutting against the flexible sheet material, so that a bending test of the flexible sheet material can be desirably implemented, and the structure is optimized.

Figure 1:
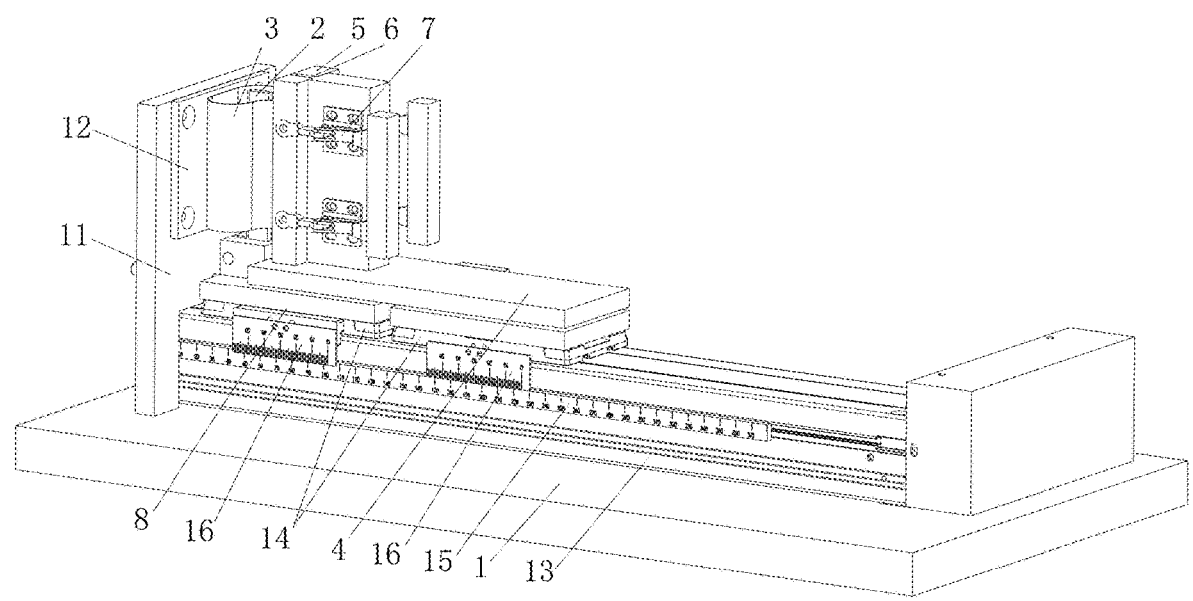
FIG. 1 is an overall schematic view from a perspective according to the present invention.

In the drawings: 1, mounting table; 2, bending shaft; 3, flexible thin film; 4, first sliding plate; 5, clamping plates; 6, clamp plate pad; 7, clamp plate wrench; 8, second sliding plate; 9, first elastic unit; 10, second elastic unit; 11, limiting stop plate; 12, protection plate; 13, guide rail; 14, sliding block; 15, main scale; and 16, vernier scale.

DETAILED DESCRIPTION OF THE PREFERRED EMBODIMENTS

The invention will be further illustrated in more detail with reference to the accompanying drawings and embodiments. It is noted that, the following embodiments are only intended for purposes of illustration but not limiting the scope of the present invention.

Figure 2:
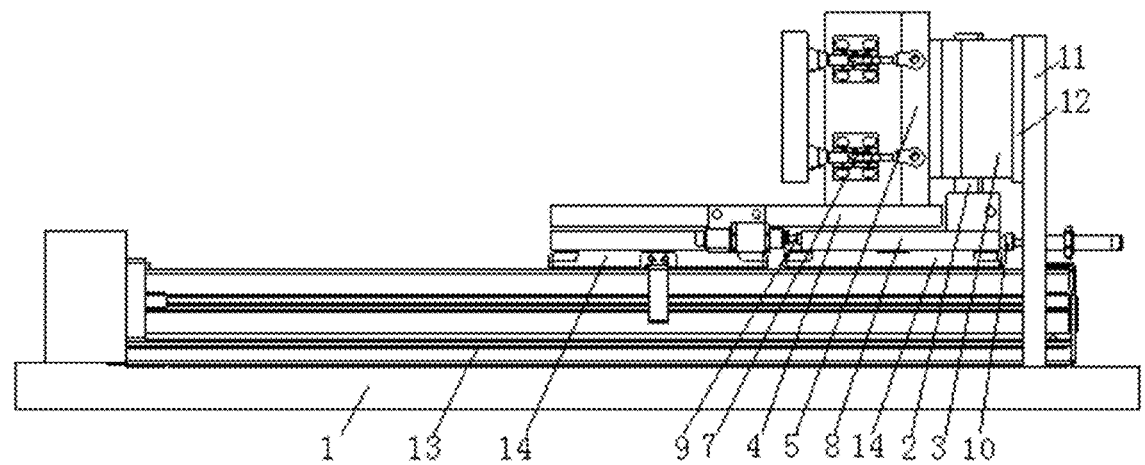
FIG. 2 is a schematic view from another perspective according to the present invention.
Figure 3:
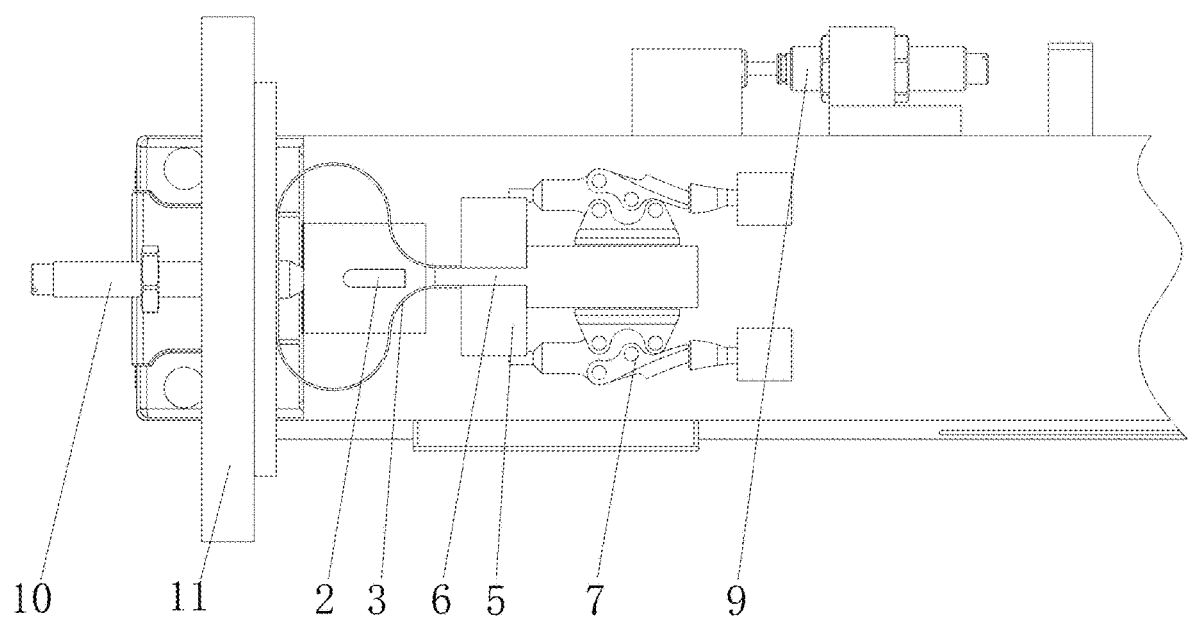
FIG. 3 is a partial top view according to the present invention.

Referring to FIG. 1 to FIG. 3, the present invention discloses a bending test apparatus and method for a flexible sheet material. The test apparatus comprises a mounting table 1, a clamping unit and a bending shaft unit that are disposed on the mounting table 1. In the present invention, a flexible sheet material is preferably a flexible display screen. In the present invention, a flexible thin film 3 is preferably clamped on the clamping unit for carrying the flexible display screen. Preferably, the flexible thin film 3 is a thin PET plastic film. In the present invention, the flexible display screen is preferably bonded to the flexible thin film 3 by an adhesive tape.

The clamping unit comprises a clamping plates and a first sliding plate 4 for mounting the clamping plates 5. The clamping plates 5 clamp two ends of the flexible thin film 3 in a Z-axis direction and enables the flexible thin film 3 to bend to enclose a barrel-like space. The clamping plates 5 comprise a clamp plate pad 6 disposed on the first sliding plate 4, clamping plates 5 symmetrically disposed on two sides of the clamp plate pad 6 along a Y axis, and clamp plate wrenches 7 disposed on the clamping plates 5 for pushing the clamping plates 5 in the X-axis direction to respectively enable two opposite ends of the flexible thin film 3 to abut against the clamp plate pad 6. With reference to the foregoing arrangement manner, the clamping plates 5, the clamp plate pad 6, and the clamp plate wrenches 7 cooperate with each other to desirably fix the flexible thin film 3, to further indirectly fix the flexible display screen disposed on the flexible thin film 3. The test apparatus further comprises a driving unit. The driving unit comprises a driving motor for driving the first sliding plate 4 in a Y-axis direction. A movement frequency of the first sliding plate 4 can be adjusted by adjusting a rotational speed and an acceleration time or a deceleration time of the motor so that a bending frequency of the flexible display screen on the plastic thin film 3 is adjusted. Preferably, in the present invention, the driving motor can be a step motor.

The shape of sidewalls of the clamping plates 5 and the clamp plate pad 6 fits the flexible thin film 3 to effectively avoid thin film 3 being subjected to uneven stress during bending. Pads are disposed on the clamping plates 5 and the clamp plate pad 6 for fixing the flexible thin film 3. During clamping and subsequent operation, it can be effectively ensured that the flexible thin film 3 will not slide relative to the clamping plates 5, thereby ensuring the measurement precision of the test apparatus.

The bending shaft unit comprises a bending shaft 2 extending in the Z-axis direction. The bending shaft 2 is positioned in the barrel-like space. The bending shaft unit further comprises a second sliding plate 8 fixedly connected to the bending shaft 2. The first sliding plate 4 slides in the Y-axis direction and abuts against the second sliding plate 8. The bending shaft 2 has an arc-shaped sidewall for abutting against the flexible display screen at an end thereof away from the clamping plates thereof. The clamping plates move in the Y-axis direction relative to the bending shaft 2. In the foregoing arrangement manner, the clamping plates drive the flexible thin film 3 to move in the Y-axis direction. The flexible display screen positioned on the flexible thin film 3 moves along with the clamping plates, until the flexible display screen abuts against and is fitted onto the arc-shaped sidewall to bend, so that a bending test of the flexible display screen is desirably implemented. The flexible thin film 3 is disposed as a carrier, so that only a small piece of flexible display screen that can be fitted onto the arc-shaped sidewall of the bending shaft 2 is needed as a test sample instead of consuming an entire flexible display screen. Therefore, test costs can be favorably reduced. Moreover, the flexible thin film 3 is applicable to different sample sizes and has high adaptability.

In the present invention, the size of the arc-shaped sidewall of the bending shaft 2 may be changed as required. Therefore, a bending radius of the bending shaft 2 can be appropriately adjusted, the adaptability is high, and the structure is optimized. In the present invention, a chord length corresponding to the arc-shaped sidewall of the bending shaft 2 is greater than or equal to a vertical distance between the clamped two ends of the flexible thin film 3 in an X-axis direction. By means of the foregoing arrangement manner, as the flexible thin film 3 drives the flexible display screen to bend, an external tensile force acting on the flexible thin film 3 is very small. Therefore, the external tensile force acting on the flexible display screen during bending can be omitted, making test data less susceptible to an external tensile force. In addition, with the bending manner using the foregoing structural arrangement, the flexible display screen can be bend up to approximately 180°, thereby achieving high practicability.

A stop plate unit extending in the Z-axis direction is disposed on the mounting table 1, the stop plate unit comprises a limiting stop plate 11 and a protection plate 12 disposed on a side of the limiting stop plate 11 near the flexible display screen, and the flexible display screen moves in the Y-axis direction to abut against the protection plate 12. The protection plate 12 is provided for abutting against the flexible display screen to enable the flexible display screen to be flat, to simulate a working state in which the flexible screen reciprocates between a bent state and a flat state, so that data of bending measurement is more genuine and reliable.

A first elastic unit 9 is disposed on the first sliding plate 4 for abutting against and driving the second sliding plate 8 in the Y-axis direction. A second elastic unit 10 is disposed on the mounting table 1 for limiting the second sliding plate 8 in the Y-axis direction. Each of the first elastic unit 9 and the second elastic unit 10 comprises a metal housing, a rubber cap, and a spring with two ends respectively acting on the metal housing and the rubber cap. The first elastic unit 9 is disposed to absorb a resilience force of the second sliding plate 8 when the first elastic unit 9 abuts against the second sliding plate 8, thereby ensuring precise and stable operation of the apparatus. The second elastic unit 10 is similarly disposed to absorb the resilient force of the second sliding plate 8 when the second sliding plate 8 abuts against the second elastic unit 10, thereby ensuring precise and stable operation of the apparatus.

A guide unit is disposed on the mounting table 1, and the guide unit comprises a guide rail 13 extending in the Y-axis direction and a plurality of sliding blocks 14 slidably connected to the guide rail 13. In the present invention, two sliding blocks are preferably provided. The first sliding plate 4 and the second sliding plate 8 are fixed on the sliding blocks 14, respectively. The sliding blocks 14 and the guide rail 13 are arranged, so that the operation of the first sliding plate 4 and the second sliding plate 8 can be desirably implemented, the structure is optimized, and there is a relatively small force of friction between the sliding blocks 14 and the guide rail 13. In the present invention, the force of friction is preferably controlled under 2 N. It should be noted that in the present invention, the second sliding plate 8 does not move during the bending test of the flexible display screen. Therefore, a tensile force on the plastic thin film 3 is less than 2 N, so that a tensile force from outside is further reduced, thereby ensuring the accuracy of data of the bending test.

The test apparatus comprises a measurement unit. The measurement unit comprises a vernier caliper, a main scale 15 of the vernier caliper is disposed on a sidewall of the guide rail 13, and a vernier scale 16 is disposed on the first sliding plate 4 and the second sliding plate 8. After the first sliding plate 4 is operated N times, due to precision errors of the members, deviations of positions of the first sliding plate 4 and the second sliding plate 8 with respect to initial values can be directly observed through the caliper to facilitate timely zero calibration By using the foregoing test apparatus, experiments of an inward bending and an outward bending of the flexible display screen can be performed. During outward bending, the flexible display screen is attached to a side of the flexible thin film 3 away from the bending shaft 2. In this case, a groove is arranged on the protection plate 12 for accommodating the flexible display screen. During inward bending, the flexible display screen is attached to a side of the flexible thin film 3 near the bending shaft 2. In this case, a groove is arranged on the bending shaft 2 for accommodating the flexible display screen. It should be noted that during outward bending, the flexible thin film 3 is attached to the front surface of the flexible display screen, and during inward bending, the flexible thin film 3 is attached to the rear surface of the flexible display screen.

The present invention further provides a bending test method for a flexible sheet material, comprising the following steps:

after an apparatus is started, origin calibration is performed firstly;

a: in an initial state, two opposite ends of a flexible thin film 3 are clamped by a clamping unit, and in this case, it is ensured that a flexible display screen is bent and attached to an arc-shaped sidewall of a bending shaft 2; driven by a step motor, a first sliding plate 4 moves in a negative direction of a Y axis until a second sliding plate 8 is pushed to abut against a second elastic unit 10, and a step distance of the movement is preferably 0.1 mm; and in this case, a sidewall of a space enclosed by the flexible thin film 3 abuts against a protection plate 12, and the flexible display screen disposed on the flexible thin film 3 is flat;

b: driven by the step motor, the first sliding plate 4 moves in a positive direction of the Y axis until the flexible thin film 3 abuts against the bending shaft 2 to bend, in this case, the flexible display screen disposed on the flexible thin film 3 is fitted onto the bending shaft in bending shape, and the first sliding plate 4 reciprocates; and c: zero point resetting: after the first sliding plate 4 reciprocates N times, the first sliding plate 4 moves in the positive direction of the Y axis, and in this case, the bending shaft 2 and the second sliding plate 8 on which the bending shaft 2 is positioned are pulled by the flexible thin film 3 to move in the positive direction of the Y axis, until the first sliding plate 4 moves to a preset zero point, wherein N is preferably 10000 in the present invention.

The above description is only preferred embodiments of the present invention and not intended to limit the present invention, it should be noted that those of ordinary skill in the art can further make various modifications and variations without departing from the technical principles of the present invention, and these modifications and variations should also be considered to be within the protection scope of the present invention.

What is claimed is:

1. A bending test apparatus for a flexible sheet material, comprising
    a mounting table,
    a clamping unit comprising clamping plates, a clamp plate pad, and clamp plate wrenches, and
    a bending shaft unit comprising a bending shaft extending in a Z-axis direction, the bending shaft having an arc-shaped sidewall for abutting against a flexible sheet material at an end thereof away from the clamping plates, and the clamping plates being movable relative to the bending shaft in a Y-axis direction,
    wherein the clamping unit further comprises a first sliding plate for mounting the clamping plates, and the clamp plate pad disposed on the first sliding plate, the clamp plates symmetrically disposed on two sides of the clamp plate pad along a Y axis, and the clamp plate wrenches disposed on the clamp plates for pushing the clamp plates in an X-axis direction such that two opposite ends of the flexible sheet material abut against the clamp plate pad; and
    wherein the clamping plates clamps two ends of the flexible sheet material in the Z-axis direction so that the flexible sheet material bends to enclose a barrel-like space, in which the bending shaft is positioned.

2. The bending test apparatus for a flexible sheet material according to claim 1, wherein a chord length corresponding to the arc-shaped sidewall of the bending shaft is greater than or equal to a vertical distance between the clamped two ends of the flexible sheet material in an X-axis direction.

3. The bending test apparatus for a flexible sheet material according to claim 1, wherein the bending shaft unit further comprises a second sliding plate fixedly connected with the bending shaft, and the first sliding plate is slidable in the Y-axis direction and abuts against the second sliding plate.

4. The bending test apparatus for a flexible sheet material according to claim 3, wherein a first elastic unit is disposed on the first sliding plate for abutting against and driving the second sliding plate in the Y-axis direction, and a second elastic unit is disposed on the mounting table for limiting the second sliding plate in the Y-axis direction.

5. The bending test apparatus for a flexible sheet material according to claim 1, wherein a stop plate unit extending in the Z-axis direction is disposed on the mounting table, the stop plate unit comprises a limiting stop plate and a protection plate disposed on a side of the limiting stop plate near the flexible sheet material, and the flexible sheet material is movable in the Y-axis direction and abuts against the protection plate.

6. The bending test apparatus for a flexible sheet material according to claim 3, wherein a guide unit is disposed on the mounting table, the guide unit comprises a guide rail extending in the Y-axis direction and a plurality of sliding block slidably connected to the guide rail, and the first sliding plate and the second sliding plate are fixedly connected to the sliding blocks, respectively.

7. The bending test apparatus for a flexible sheet material according to claim 6, wherein the apparatus further comprises a measurement unit including a vernier caliper, a main scale of the vernier caliper is disposed on a sidewall of the guide rail, and a vernier scale is disposed on the first sliding plate and the second sliding plate.

8. A bending test method for a flexible sheet material, comprising the steps of:

a: conducting step (a) wherein in an initial state, two opposite ends of a flexible sheet material are clamped by a clamping unit so that the sheet flexible material has a hollow barrel-like shape, a first sliding plate moves in a negative direction of a Y axis until a second sliding plate is pushed to abut against a second elastic unit where a first side of a sidewall of the hollow barrel-like flexible sheet material abuts against a protection plate so that the sidewall of the flexible sheet material is flattened;

b: conducting step (b) wherein the first sliding plate moves in a positive direction of the Y axis until an opposite second side of the sidewall of the flexible sheet material touches a bending shaft and then the sheet flexible material begins to bend as the first sliding plate continues to move, until the flexible sheet material is fitted onto the bending shaft in bending shape fully, and the first sliding plate reciprocates; and c: conducting step (c) comprising zero point resetting: after the first sliding plate reciprocates N times, the first sliding plate moves in the positive direction of the Y axis where the bending shaft is pulled by the flexible sheet material to move in the positive direction of the Y axis, until the first sliding plate moves to a preset zero point, wherein during the reciprocating of the first sliding plate, under a friction force generated between the second sliding plate and a guide rail, the bending shaft does not displace relative to a mounting table.

* * * * *